United States Patent
Reynolds et al.

(10) Patent No.: US 10,116,145 B2
(45) Date of Patent: Oct. 30, 2018

(54) PERFORMANCE ADJUSTMENT FOR WIRELESS POWER TRANSFER DEVICES

(71) Applicant: uBeam Inc., Santa Monica, CA (US)

(72) Inventors: Paul Reynolds, Santa Monica, CA (US); Sean Taffler, Pacific Palisades, CA (US); Andrew Joyce, Venice, CA (US)

(73) Assignee: uBeam Inc., Marina Del Rey, CA (US)

( * ) Notice: Subject to any disclaimer, the term of this patent is extended or adjusted under 35 U.S.C. 154(b) by 342 days.

(21) Appl. No.: 14/885,652

(22) Filed: Oct. 16, 2015

(65) Prior Publication Data
US 2017/0110886 A1 Apr. 20, 2017

(51) Int. Cl.
*H02J 5/00* (2016.01)
*H02J 50/80* (2016.01)
*H02J 50/90* (2016.01)

(52) U.S. Cl.
CPC .............. *H02J 5/005* (2013.01); *H02J 50/80* (2016.02); *H02J 50/90* (2016.02)

(58) Field of Classification Search
CPC .. H02J 5/005; H02J 7/025; H02J 17/00; H02J 50/05; H02J 50/10; H02J 50/12; H02J 50/20; H02J 50/80; H02J 50/90
USPC ........................................................ 307/104
See application file for complete search history.

(56) References Cited

U.S. PATENT DOCUMENTS

| | | | |
|---|---|---|---|
| 4,197,478 A | 4/1980 | Silvus, Jr. | |
| 6,154,711 A | 11/2000 | Steffan et al. | |
| 8,667,452 B2 * | 3/2014 | Verghese | G06F 17/5036 307/104 |
| 8,922,066 B2 * | 12/2014 | Kesler | B60L 11/1812 307/104 |
| 9,643,505 B2 * | 5/2017 | Ichikawa | B60L 11/182 |
| 9,698,873 B2 * | 7/2017 | Uchida | H04B 5/0037 |
| 9,722,448 B2 * | 8/2017 | Radovic | H02J 7/025 |
| 2003/0041657 A1 | 3/2003 | Degertekin | |
| 2004/0040165 A1 | 3/2004 | Bowes et al. | |
| 2009/0045772 A1 | 2/2009 | Cook et al. | |
| 2009/0243397 A1 * | 10/2009 | Cook | H02J 5/005 307/104 |
| 2011/0193416 A1 | 8/2011 | Campanella et al. | |
| 2011/0270561 A1 | 11/2011 | Gregg et al. | |
| 2014/0091636 A1 | 4/2014 | Ofstein et al. | |

(Continued)

OTHER PUBLICATIONS

International Search Report and Written Opinion dated Dec. 28, 2016 as received in Application No. PCT/US2016/056423.

*Primary Examiner* — Levi Gannon
(74) *Attorney, Agent, or Firm* — Morris & Kamlay LLP

(57) ABSTRACT

Systems and techniques are provided for performance adjustment for wireless power transfer devices. A wireless power transfer device may be activated. A characteristic of the performance of the activated wireless power transfer device may be measured. It may be determined that the measured characteristic of the activated wireless power transfer device does not meet a performance requirement for the wireless power transfer device. An adjustment to be applied to the wireless power transfer device may be determined. The adjustment may be based on determining that the measured characteristic of the activated wireless power transfer device does not meet the performance requirement for the wireless power transfer device. The adjustment may be applied to the wireless power transfer device.

35 Claims, 7 Drawing Sheets

(56) References Cited

U.S. PATENT DOCUMENTS

| | | | | |
|---|---|---|---|---|
| 2014/0174870 A1* | 6/2014 | Niizuma | ............... | H02J 5/005 |
| | | | | 191/10 |
| 2014/0355456 A1 | 12/2014 | Jiang et al. | | |
| 2015/0280790 A1* | 10/2015 | Onizuka | ............... | H02J 17/00 |
| | | | | 320/108 |
| 2016/0103191 A1* | 4/2016 | Von Novak, III | ..... | G01R 33/02 |
| | | | | 324/244 |
| 2016/0178676 A1* | 6/2016 | Wallman | ............... | H02J 50/12 |
| | | | | 702/61 |

* cited by examiner

PERFORMANCE ADJUSTMENT FOR WIRELESS POWER TRANSFER DEVICES

BACKGROUND

Devices used in wireless power transfer may be subject to uncertainty and variance in both the materials and processes used to manufacture the devices. Different wireless power transfer devices manufactured using the same materials and processes may perform at different levels, and in some cases may be unsuitable for their originally intended use. This may reduce the yield of usable wireless power transfer devices that can be obtained from a given amount of materials.

BRIEF SUMMARY

According to an embodiment of the disclosed subject matter, a wireless power transfer device may be activated. A characteristic of the performance of the activated wireless power transfer device may be measured. It may be determined that the measured characteristic of the activated wireless power transfer device does not meet a performance requirement for the wireless power transfer device. An adjustment to be applied to the wireless power transfer device may be determined. The adjustment may be based on determining that the measured characteristic of the activated wireless power transfer device does not meet the performance requirement for the wireless power transfer device. The adjustment may be applied to the wireless power transfer device.

A test device may activate a wireless power transfer device, measure a characteristic of a wireless power transfer device that has been activated, and generate performance data from the measured characteristic. A computing device may compare the performance data to performance requirements associated with a user for the wireless power transfer device, determine whether the performance data meets the performance requirements, and generate adjustment data indicating adjustments to be made to the wireless power transfer device. An adjustment device may to apply the adjustments indicated by the adjustment date to the wireless power transfer device.

A type of activation may be provided to a wireless power transfer device to activate the wireless power transfer device. Performance data may be generated from measurements taken of characteristics of the wireless power transfer device while the wireless power transfer device is activated by the type of provided activation. Whether the performance data meets performance requirements for a first use of the wireless power transfer device may be determined. When the performance data meets the performance requirements for the first use, that the wireless power transfer device is passed for the first use may be indicated. When the performance data does not meet the performance requirements for the first use, whether adjustments to the wireless power transfer device are possible may be determined. When adjustments to the wireless power transfer device are possible, adjustment data indicating adjustments to be applied to the wireless power transfer device may generated, the adjustments indicated by the adjustment data may be applied to the wireless power transfer device, the type of activation may be provided to the adjusted wireless power transfer device to activate the adjusted wireless power transfer device, new performance data may be generated from measurements taken of characteristics of the adjusted wireless power transfer device while the adjusted wireless power transfer device is activated by the type of provided activation, and whether the new performance data meets the performance requirements for the first use of the wireless power transfer device may be determined. When adjustments to the wireless power transfer device are not possible, whether performance requirements for a second use of the wireless power transfer device are available may be determined. When performance requirements for a second use of the wireless power transfer device are available, whether the performance data meets performance requirements for the second use of the wireless power transfer device may be determined. When performance requirements for a second use of the wireless power transfer device are not available, that the wireless power transfer device is failed for the first use may be indicated.

Performance data for a wireless power transfer device may be received. It may be determined that the performance data for the wireless power transfer device does not meet performance requirements for a use for the wireless power transfer device. Adjustment data indicating adjustments to be applied to the wireless power transfer device may be generated.

Systems and techniques disclosed herein may allow for performance adjustment for wireless power transfer devices. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
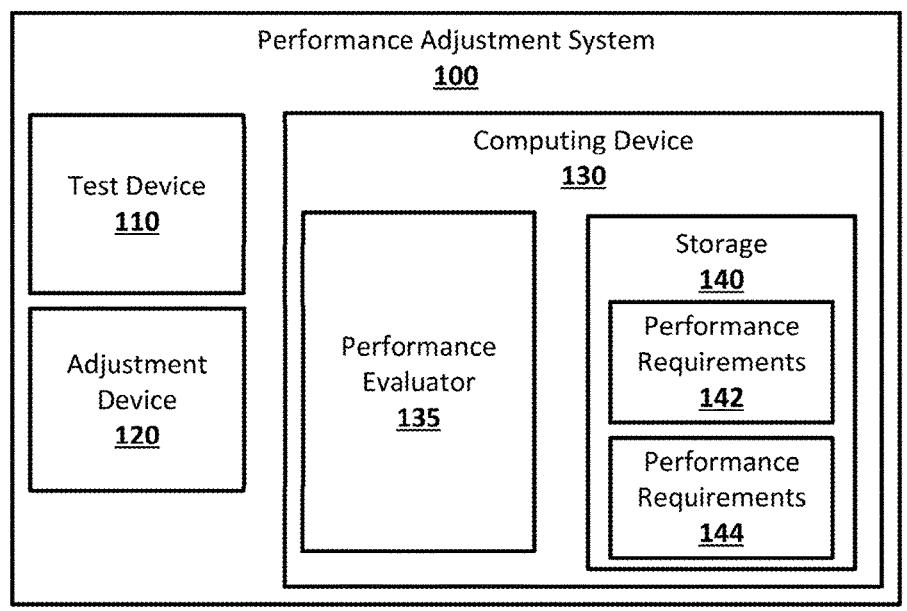
FIG. 1 shows an example system suitable for performance adjustment for wireless power transfer devices according to an implementation of the disclosed subject matter.

According to embodiments disclosed herein, performance adjustments may be made to wireless power transfer devices. A wireless power transfer device may be tested to determine whether it performs well enough to be suitable for use in a wireless power transfer system. If the wireless power transfer device does not perform well enough for use in a wireless power transfer system, it may be adjusted to perform better.

Performance adjustment for wireless power transfer devices may allow for wireless power transfer devices that do not perform at a specified level after manufacture to be adjusted to perform at the specified level. A wireless power transfer device may be tested using a suitable test device. The test device may activate the wireless power transfer device, causing the wireless power transfer device to operate as it would in a wireless power transfer system. Various characteristics of the operation of an activated wireless power transfer device may be measured by the test device, generating performance data. The performance data for the wireless power transfer device measured by the test device may be compared to performance requirements for the wireless power transfer device. The performance requirements may indicate some minimum, maximum, or desired values for the measured characteristics or values derived therefrom in the performance data, which may be used to determine if the wireless power transfer device performs at a level that is suitable for use in a wireless power transfer system. If the wireless power transfer device performs at a suitable level for use in wireless power transfer, the wireless power transfer device may be designated as "passed." Otherwise, adjustments that may improve the performance of the wireless power transfer device may be determined. The adjustments may be applied to the wireless power transfer device by a suitable adjustment device, and may be made to hardware of the wireless power transfer device, software, such as firmware, of the wireless power transfer device, or both. The wireless power transfer device may be retested, and may be further adjusted if necessary. If the wireless power transfer device cannot be adjusted further, and still does not perform at a level suitable for use in wireless power transfer, the wireless power transfer device may be designated as "failed."

In some implementations, when a wireless power transfer device does not perform at a level suitable for wireless power transfer, the measured performance of the wireless power transfer device may be compared to performance requirements for other possible uses for the wireless power transfer device. If the wireless power transfer device performs at a level suitable for some other use, it may be passed for that use. The wireless power transfer device may also be adjusted based on the performance requirements for some other use, until either the wireless power transfer device passes for one of the other uses, or until no further adjustments are possible, resulting in the wireless power transfer device being failed.

A wireless power transfer device may be any suitable device that may be used for wireless power transfer. For example, a wireless power transfer device may be an ultrasonic transmitter, which may include a number of individual transducer elements. Each transducer element may be a separate vibrator of any suitable type, such as, for example, a piezoelectric cantilever with a free end and a fixed end. The ultrasonic transmitter may transmit wireless power through ultrasonic waves generated by the transducer elements. The transducer elements of an ultrasonic transmitter may be covered with a membrane, which may be any suitable material for assisting in the translation of the movement of the cantilever to movement of the transmission medium, which may be the air. A wireless power transfer device may be a radio frequency (RF) transmitter, which may transmit wireless power using RF waves, or an optical transmitter which may transmit wireless power using light from any suitable part of the light spectrum, including, infrared and ultraviolet light. A wireless power transfer device may be capable of sending wireless power, receiving wireless power, sending wireless communications, receiving wireless communications, and performing other functions, such as, for example, imaging and obstacle detection. A wireless power transfer device may be manufactured in any suitable manner, using any suitable materials.

After or during the manufacture of a wireless power transfer device, the wireless power transfer device may be tested. The wireless power transfer device may be tested by any suitable test device. The test device may, in any suitable manner, activate the wireless power transfer device, causing the wireless power transfer device to operate as it would when being used to transfer wireless power, or to behave in a manner that allows for measurement of some characteristic of the wireless power transfer device related to the ability to transfer wireless power. For example, an ultrasonic transmitter may be connected to electrical power so that an electrical signal may be supplied to drive the transducer elements of the ultrasonic transmitter. The electrical signal may be supplied to any number of the transducer elements at the same time. The electrical signal may be pulsed through Fast Fourier Transform (FFT) filter, which may result in broadband ultrasonic wave output from the ultrasonic transmitter, or may be supplied at a single frequency, which may be swept across a frequency range, resulting in a series of single frequency outputs from the ultrasonic transmitter. An RF transmitter or optical transmitter may similarly be supplied with an electrical signal to cause the RF transmitter to output an RF signal which may be similar to an RF signal that would be used to transmit wireless power or cause the optical transmitter to output an optical signal which may be similar to an RF signal that would be used to transmit wireless power. An ultrasonic transmitter may also be activated by placing the ultrasonic transmitter on a plate and vibrating the plate to evaluate the resonance of the transducer elements at various vibration frequencies. An ultrasonic transmitter or RF transmitter may also be activated by the delivery of suitable wireless power or communications from another ultrasonic transmitter, optical transmitter, or RF transmitter, which may allow for the evaluation of how well the ultrasonic transmitter, optical transmitter, or RF transmitter acts as receiver of wireless power or communications. Other types of activation may be used that may allow the evaluation of the resonance of the transducer elements of an ultrasonic transmitter. A wireless power transfer device may be activated in more than one way during testing.

The test device may, in any suitable manner using any suitable combination of hardware instrumentation and software, measure characteristics of a wireless power transfer device that is being tested to generate performance data. The measurements may occur while the wireless power transfer device is activated. For example, a laser vibrometer may be used to measure the vibration amplitude and frequency of the transducer elements of an ultrasonic transmitter. The laser vibrometer may be pointed at the tip of each cantilever of the transducer elements. Any suitable characteristics may be measured, including, for example, the amplitude, frequency, and phase of output from a wireless power transfer device such as ultrasonic, optical, or RF transmitter, peak frequency response, bandwidth, efficiency, directivity, signal-to-noise, sensitivity, or electrical amplitude impedance of a wireless power transfer device, power and power density transferred by a wireless power transfer device, for example, as measured at a suitable wireless power receiver at a given distance from a tested wireless power transfer device, power generated by a wireless power transfer device when receiving wireless power from a suitable wireless power transmitter, and data transmission rate and error rate of a wireless power transfer device when used in a data transmit or receive mode. A wireless power transfer device may be subject to any number of different tests, resulting in measurements of any number of characteristics of the wireless power transfer device, with each test repeated any number of times, to generate performance data indicating the characteristics of the wireless power transfer device. Different types of activation may provide differing characteristics for a wireless power transfer device. For example, activating an ultrasonic transmitter with an electrical signal may provide characteristics related the ultrasonic transmitter's ability to transmit wireless power, while activating the ultrasonic transmitter by vibrating a plate and measuring electrical or vibration resonance of the ultrasonic transmitter and transducer element, or using another ultrasonic transmitter to transmit wireless power to the tested ultrasonic transmitter, may provide characteristics related to the ultrasonic transmitter's ability to receive wireless power.

The performance data, including the measured characteristics of the tested wireless power transfer device, may be analyzed. The performance data may be analyzed by, for example, determining additional characteristics of the wireless power transfer device from the measured characteristics in the performance data. For example, a center frequency and bandwidth may be determined for an ultrasonic transmitter. The measured characteristics may be extrapolated to generate additional performance data.

The performance data, including characteristics of the tested wireless power transfer device and any characteristics resulting from analysis of the measured performance characteristics, may be compared, using any suitable computing device with any suitable hardware and software, to performance requirements for the wireless power transfer device. Performance requirements for a wireless power transfer device may indicate some level of performance that a wireless power transfer device should achieve to be deemed suitable for use in some application and may also specify conditions under which such performance levels should be achieved. For example, a performance requirement may indicate a minimum power output of 2 watts per square centimeter at a distance of at least five meters from the transmitter, with an ambient air temperature between 15 and 22 degrees centigrade. Performance requirements may be specified in any suitable manner, and may include any suitable metrics, including, for example, a center frequency at which a wireless power transfer device should be able to emit at or receive at, minimum or maximum amplitude, power level, or power densities that the wireless power transfer device may generate, a minimum number of transducer elements that must be able to vibrate in phase or within a phase range at a given frequency or a minimum number of transducer elements with a phase that can be controlled within a specified margin of error, a minimum level of power generated by a wireless power transfer device when receiving a specified level of transmitted power, a minimum efficiency for transmitting or receiving wireless power at a specified frequency, and a minimum effective range of wireless power transmission.

There may be any number of performance requirements, associated with any number of uses, which may be compared with the performance data of a tested wireless power transfer device. For example, performance requirements for wireless power transmission may indicate the level of performance a wireless power transfer device should achieve to be used for transmitting wireless power, while performance requirements for wireless power receiving may indicate the level of performance a wireless power transfer device should achieve to be used for receiving wireless power. Some performance requirements may be for non-wireless power transfer uses, such as, for example, imaging, range finding, obstacle detection, or communications. Performance requirements for different uses may share metrics, or may have overlapping metrics. Performance requirements for a use may be a subset of performance requirements for some other use, such that a wireless power transfer device that meets the performance requirements for one use may also meet the performance requirements for another use. For example, an ultrasonic transmitter that meets the performance requirements for use in wireless power transmission may also meet the performance requirements for use in wireless power receiving, ultrasonic communications, and ultrasonic imaging.

It may be possible for a wireless power transfer device to meet the performance requirements for one use, but not for any other use. For example, an ultrasonic transmitter may meet the performance requirements for ultrasonic imaging, but not for ultrasonic communications or wireless power transmission or receiving. Performance requirements for different uses may also be wholly or partially disjoint. A wireless power transfer device that meets the performance requirements for one use may or may not also meet the performance requirements for another use when the performance requirements are wholly or partially disjoint. For example, an ultrasonic transmitter may meet the performance requirements for use in ultrasonic imaging, but this may not be an indication whether the ultrasonic transmitter would meet the performance requirements for ultrasonic communication. Performance requirements for different uses may also be contradictory, so that a wireless power transfer device which meets the performance requirements for one use cannot also meet the performance requirements for some other use with contradictory performance requirements.

The comparison between the performance data for a tested wireless power transfer device and performance requirements may determine if the wireless power transfer device is suitable for the use associated with the performance requirements. If the wireless power transfer device is suitable for the use, the wireless power transfer device may be passed with an indication of the use, and the wireless power transfer device may then be used for that particular use, or any other use whose performance requirements are a subset of that use. For example, an ultrasonic transmitter may meet the requirements for use in wireless power transmission, and may be passed with an indication that the ultrasonic transmitter may be used for wireless power transmission and for wireless power receiving, ultrasonic imaging, and ultrasonic communications, which may all have their own performance requirements that can be subsets, supersets or independent of the performance requirements for wireless power transmission.

If the wireless power transfer device is not suitable for the user associated with the performance requirements, adjustments that may improve the performance of the wireless power transfer device may be determined. The adjustments may be determined so that the wireless power transfer device, after being adjusted, may meet the performance requirements that it did not initially meet. For example, if the measured characteristics of a wireless power transfer device do not meet the performance requirements for use in wireless power transmission, the adjustments may be determined so that the wireless transfer device may meet those requirements and be used for wireless power transmission. The adjustments may be any suitable adjustments that may be possible to make to the wireless power transfer device given its state of manufacture. For example, adjustments may involve changes to the lengths, shapes, thickness, or electrodes or other physical aspects of the freely moving sections of cantilevers of transducer elements in an ultrasonic transmitter or the removal of mass from an ultrasonic transmitter, for example, through removal of parts of a membrane without puncturing the membrane, such as through ablation. Adjustments may be made to elements such as membrane stiffening mechanisms such as appliques or coatings. Likewise, masks and filters may be applied to all or part of the array. In an implementation, a mask or filter is created that varies in its properties in different regions in ways designed to compensate for and improve on the performance characteristics of one or more different regions of an underlying transducer array. Resistors used in integrated circuits of the wireless power transfer device may be trimmed, for example, using laser. The capacitance of an integrated circuit may also be trimmed. The spacing between elements of an RF device may be adjusted, for example, narrowing or widening the space between elements in any dimension. The surface properties of a wireless power transfer device, such as an optical device, may be changed to adjust the lensing of the device. It may also be determined that no adjustments to the wireless power transfer device are possible that would allow the wireless power transfer device to meet the performance requirements it has already failed to meet. This may result in the wireless power transfer device being failed for one or more uses.

In some implementations, before a wireless power transfer device is failed because no adjustments are possible to make it suitable for a first use, it may have its performance data compared to performance requirements for some other use. There may be a hierarchy of uses, with the performance data of the wireless power transfer device compared to performance requirements for uses at the top of hierarchy, and then to other uses lower down the hierarchy as the wireless power transfer device fails to meet and cannot be adjusted to meet higher up performance requirements.

For example, a wireless power transfer device may have its performance data compared to the performance requirements for use in wireless power transmission first. After failing to meet the performance requirements for wireless power transmission, and after determination that the wireless power transfer device cannot be adjusted to meet those requirements, the performance data for the wireless power transfer device may be compared to the performance requirements for wireless power receiving. Failing, and being unable to be adjusted, to meet the performance requirements for wireless power receiving, the wireless power transfer device may have its performance data compared to performance requirements for other uses until the wireless power transfer device either meets, possibly after adjustments, the performance requirements for some use, or is failed for some number of uses or all possible uses.

The hierarchy of uses may be arranged in any suitable manner. For example, the use with the highest or most stringent performance requirements, or the use for which the majority of wireless power transfer devices are intended, may be highest in the hierarchy. Other uses may be arranged in the hierarchy based on, for example, the demand for devices for a particular use, the economic value of devices for a particular use, or the suitability of a device for a use. For example, an ultrasonic transmitter that does not meet the performance requirements for wireless power transmission or receiving may have its performance data compared to the performance requirements for ultrasonic imaging before the performance requirements for any other use when, for example, ultrasonic imaging devices are in higher demand or have more economic value than devices for, for example, ultrasonic communications, or the ultrasonic transmitter is more suited to ultrasonic imagining than ultrasonic communication based on its measured characteristics.

In some implementations, a wireless power transfer device may be passed for a use when it does not meet the performance requirements for that use if appropriate adjustments may be made in future manufacturing steps. For example, it may be determined that an ultrasonic transmitter does not meet the performance requirements for wireless power transmission based on the measured characteristics of the ultrasonic transmitter, but may meet those performance requirements if changes are made to the way a membrane is added to the ultrasonic transmitter in a later manufacturing step. For example, the manner in which the membrane is bonded to the ultrasonic transmitter, and the transducer elements, may be adjusted so that the ultrasonic transmitter meets the performance requirements for wireless power transmission once the membrane is added.

Adjustments to a wireless power transfer device may be implemented in any suitable manner. Adjustments may involve any combination of addition and subtraction of mass from a wireless power transfer device and components thereof, and of movement or alteration of components of a wireless power transfer device. For example, an ultrasonic transmitter may have its output frequency adjusted through the use of a laser, which may remove mass from the structure of the ultrasonic transmitter so as to alter the frequency of the output. The laser may, for example, be used to shave down the tips of the cantilevers of the transducer elements, for example removing some number of microns of length of the cantilever, which may raise the maximum output frequency of the ultrasonic transmitter. The number of microns of length removed may be determined in any suitable manner, and may be a set amount, or may be, for example, linear or non-linear with the desired adjustment to the frequency of the ultrasonic transmitter. Mass may be removed from other sections of an ultrasonic transmitter, such as, for example, a membrane covering the transducer elements. Mass may also be added to an ultrasonic transmitter, for example, extending the base below a cantilever of a transducer element, thereby reducing the length of a freely moving portion of the cantilever. Mass may be added using, for example, direct laser sintering in which metal powder may be fused to the tip of the cantilever. Micro 3d printing may also be used to add mass. A wireless power transfer device with moveable elements, such as an RF device with moveable antenna elements, may have the spacing between elements adjusted, or the orientation of elements changed.

Adjustments may also be made to the software or firmware of a wireless power transfer device. Firmware may be adjusted to compensate for any performance variance of the wireless power transfer device, so that the wireless power transfer device may be used with and controlled by other software and hardware without requiring changes to that software and hardware. For example, an RF device may have firmware adjusted to change the power delivered to individual antenna elements so that output from the RF device matches some desired output based on a given input to the RF device. An ultrasonic transmitter may have firmware adjusted to modify the phase, amplitude, frequency, or other characteristic of an incoming electrical signal as applied to individual transducer elements of the ultrasonic transmitter. This may compensate for variations in the performance of individual transducers, allowing a desired output to be achieved for a given input electrical signal. Any suitable device may be used to implement adjustments to a wireless power transfer device, including, for example, a laser, a milling device, a wire saw, or any suitable device for updating firmware of an electronic device. In an implementation, the shape of the array may be adjusted to make it more convex or more concave.

After adjustments have been applied to a wireless power transfer device, the wireless power transfer device may be tested again using the test device. The characteristics of the wireless power transfer device may be measured to generated data performance data which may be again be compared to performance requirements for various uses to determine if the wireless power transfer device meets any performance requirements after application of the adjustments. If the wireless power transfer device does not meet any of the performance requirements to which its performance data is compared, the wireless power transfer device may be adjusted again, or may be failed. A wireless power transfer device may be subject to any number of rounds of testing and adjustment, and may have its performance data compared to any number of performance requirements for any number of uses. For example, a wireless power transfer device may only be subject to testing twice, and adjustment once, after which it may be failed if no performance requirements are met, or a wireless power transfer device may be subject to testing and adjustment until it is no longer possible to apply further adjustments to attempt to meet the most lenient performance requirements available.

Data may be gathered during the testing and adjustment of wireless power transfer devices. For example, performance data for a wireless power transfer device may gathered from before and after adjustments are applied to a wireless power transfer device, and may be correlated with the applied adjustments. This may allow for a determination of how various adjustments affect the characteristics of wireless power transfer devices. Adjustments applied to wireless power transfer devices may be refined based on these performance affects, allowing for future adjustments to wireless power transfer devices to better achieve desired effects on the performance and avoid undesired effects, such as the rendering of a wireless power transfer device unsuitable for any use. In an implementation, performance data gathered from a wireless power transfer device may be stored, for example, on the wireless power transfer device, or separately and associated with the wireless power transfer device by, for example, a unique identification. The performance data may include data on the performance of individual elements of the wireless power transfer device, such as, for example, transducer elements of an ultrasonic device. The performance data may be used to change parameters of operation of the wireless power transfer device. For example, the performance data may be used to adjust the parameters of operation to equalize the performance of individual elements of the wireless power transfer device, for example, by adjusting the electrical signal input into the wireless power transfer device before it's delivered to individual elements.

FIG. 1 shows an example system suitable for performance adjustment for wireless power transfer devices according to an implementation of the disclosed subject matter. A performance adjustment system 100 may include a test device 110, an adjustment device 120, and a computing device 130. The performance adjustment system 100 may be, for example, an automated system capable of testing and adjusting a device, such as a wireless power transfer device, with or without human intervention, and may use any suitable hardware and software. The performance adjustment system 100 may be part of an assembly line used for the manufacture of the wireless power transfer devices. The test device 110 may be any suitable combination of hardware and software for testing a wireless power transfer device, including activating the wireless power transfer device and measuring the characteristics of the wireless power transfer device to generated performance data. The adjustment device 120 may be any suitable combination of hardware and software for applying adjustment to a wireless power transfer device, which may alter or adjust the performance of the wireless power transfer device. The computing device 130 may be any suitable computing device, such as, for example, a computer 20 as described in FIG. 7, or component thereof, for implementing a performance evaluator 135 and the storage 140. The computing device 130 may be a single computing device, or may include multiple connected computing devices, and may be, for example, a laptop, a desktop, an individual server, a server farm, or a distributed server system, or may be a virtual computing device or system. The computing device 130 may be part of a computing system and network infrastructure, or may be otherwise connected to the computing system and network infrastructure. The performance evaluator 135 may be any suitable combination of hardware and software on the computing device 130 for comparing performance data for a wireless power transfer device to performance requirements for various uses, determining if the wireless power transfer device should be passed, failed, or adjusted, and determining any adjustments that should be made to the wireless power transfer device. The storage 140 may store performance requirements, such as the performance requirements 142 and 144, which may be performance requirements for uses for the wireless power transfer device.

The test device 110 may be any suitable combination of hardware and software for testing wireless power transfer devices. The test device 110 may be able to activate the wireless power transfer device. For example, test device 110 may be able to supply an electrical signal to a wireless power transfer device, may be able transmit wireless power to the wireless power transfer device, or may be able to vibrate a wireless power transfer device that uses any vibrating elements, such as transducer elements of an ultrasonic transmitter. An activated wireless power transfer device may operate as it would when being used to transfer wireless power, or may behave in a manner that allows for measurement of some characteristic of the wireless power transfer device related to the ability to transfer wireless power or related to some other use for the wireless power transfer device. The test device 110 may be able to test any number of individual elements, such as transducer elements, of a wireless power transfer device at the same time. The test device 110 may supply an electrical signal that may be single frequency or tone, multiple frequencies or tones, or a swept frequency such as a chirp. The test device 110 may be able to activate any number of wireless power transfer devices at a given time, and may be able to use more than one type of activation at a given time.

The test device 110 may be able to measure characteristics of a wireless power transfer device that is being tested, generating performance data including the measured characteristics. The test device 110 may be able to measure the characteristics while the wireless power transfer device is activated. The test device 110 may use any suitable hardware to measure the characteristics of the wireless power transfer device 110 and generate performance data. For example, the test device 110 may use a laser vibrometer may be used to measure the vibration phase, amplitude and frequency of the transducer elements of an ultrasonic transmitter, may use a wireless power receiver to receive wireless power transferred by the wireless power transfer device, or wireless communications from the wireless power transfer device, or may use a wireless power transmitter to transmit wireless power or communications to the wireless power transfer device. The test device 110 may measure any suitable characteristics, including, for example, the amplitude, frequency, and phase of output from a wireless power transfer device such as ultrasonic, optical, or RF transmitter, peak frequency response, phase, efficiency, directivity, signal-to-noise, sensitivity, bandwidth, electrical amplitude impedance of a wireless power transfer device, power and power density transferred by a wireless power transfer device, for example, as measured at a suitable wireless power receiver at a given distance from a tested wireless power transfer device, power received by a wireless power transfer device from a suitable wireless power transmitter, and data transmission rate and error rate of a wireless power transfer device when used in a data or receive transmit mode. The test device 110 may be able to measure the characteristics of any number of wireless power transfer devices at the same time, and may measure any number of the characteristics simultaneously. Different types of activation may allow for the measurement of different characteristics.

The test device 110 may be able to communicate, through any suitable wired or wireless connection, with the computing device 130, or any other computing device. For example, the test device 110 may send performance data including measured characteristics of a tested wireless transfer device to the computing device 130. The test device 110 may receive commands or instructions regarding the activation and testing of wireless power transfer devices from the computing device 130 or any other computing device. For example, the test device 110 may receive instructions from the computing device 130 indicating what types of activation should be used on a wireless power transfer device, and which characteristics should be measured.

The adjustment device 120 may be any suitable combination of hardware and software for software for applying adjustment to a wireless power transfer device. The adjustments, which may be indicated by adjustment data generated by the performance evaluator 135, may be alterations that are to be made to a wireless power transfer device or adjust the performance of the wireless power transfer device. The adjustment device 120 may be able to apply adjustments to a wireless power transfer device in any suitable manner. For example, the adjustment device 120 may use a laser, mill, wire saw, epoxy, manipulators, or a connection to an electronic storage, or any other suitable equipment. The adjustment device 120 may be able to add or remove mass from a wireless power transfer device and components thereof, and may also be able to alter, move, or otherwise adjust the position or change the shape of components of a wireless power transfer device without independent of the addition or subtraction of mass, and may be able to modify, update, or replace firmware of a wireless power transfer device. The adjustment device 120 may be automated, and may be able to operate and apply adjustment without any human intervention. The adjustment device 120 may be able to apply adjustments to any number of wireless power transfer devices at the same time.

The adjustment device 120 may be able to communicate, through any suitable wired or wireless connection, with the computing device 130, or any other computing device. For example, the adjustment device 120 may receive may receive adjustment data along with commands or instructions regarding the adjusting of wireless power transfer devices from the computing device 130 or any other computing device. For example, the adjustment device 120 may receive adjustment data and a command to implement the adjustment data by making adjustments to a wireless power transfer device from the computing device 130. The adjustment device 130 may send any suitable data to any suitable computing device. For example, the adjustment device 130 may send data regarding the status and success or failure of the implementation of adjustments on a wireless power transfer device to the computing device 130.

The performance evaluator 135 may be any suitable combination of hardware and software on the computing device 130 for comparing performance data for a wireless power transfer device to performance requirements for various uses, determining if the wireless power transfer device should be passed, failed, used for a different application, or adjusted, and determining any adjustments that should be made to the wireless power transfer device. The performance evaluator 135 may be able to receive performance data, for example, form the test device 110, indicating measured characteristics of a wireless power transfer device. The performance evaluator 135 may then compare the performance data to performance requirements, such as the performance requirements 142, to determine if the wireless power transfer device is suitable for the use associated with the performance requirements.

Performance requirements, such as the performance requirements 142 and 144, may include metrics for various measured characteristics for a wireless power transfer device, including various minimums, maximums, or desired ranges. Metrics in the performance requirements 142 and 144 may include, for example, a center frequency at which a wireless power transfer device should be able to emit at or receive at, minimum or maximum amplitude, power level, or power densities that the wireless power transfer device may generate, a minimum number of transducer elements that must be able to vibrate in phase or within a phase range at a given frequency or a minimum number of transducer elements with a phase that can be controlled within a specified margin of error, a minimum level of power generated by a wireless power transfer device when receiving a specified level of transmitted power, a minimum efficiency for transmitting or receiving wireless power at a specified frequency, and a minimum effective range of wireless power transmission. Any number of performance requirements associated with any number of uses may be stored in the storage 140, and may be stored in any suitable manner.

The performance evaluator 135 may be able to indicate that a wireless power transfer device is passed for a use when the measured characteristics in the performance data meet the performance requirements associated with that use. The performance evaluator 135 may be able to determine adjustments that may be made to a wireless power transfer device that may allow the wireless power transfer device to meet the performance requirements for a use. The performance evaluator 135 may be able to generate adjustment data, which may be used by the adjustment device 120 to make the determined adjustments to the wireless power transfer device. The determined adjustments may be the addition or removal of mass to or from various components of a wireless power transfer device or manipulation or alteration of various components, including changing the shape of components or moving or partially moving components. The performance evaluator 135 may be able to indicate that a wireless power transfer device is failed for any number of uses when the measured characteristics in the performance data do not meet the performance requirements associated with those uses.

The performance evaluator 135, and computing device 130, may be part of the testing device 110, adjustment device 120, or may be separate. For example, the computing device 130 may be a separate computing device to which the testing device 110 and the adjustment device 120 are connected as accessories, controlled wholly or partially by the computing device 130. The test device 110 and adjustment device 120 may also be independent devices with their own computation resources, which may receive instructions remotely, for example, from the computing device 130 but may be controlled locally, for example, by a computing device integrated with the testing or adjustment hardware. The test device 110 and adjustment device 120 may be separate devices, and a wireless power transfer device may be moved between them, for example, by hand, or using automated or human controlled hardware. The test device 110 and adjustment device 120 may be components of the same device, or may have access to some device used to hold a wireless power transfer device, such that the wireless power transfer device may be tested and adjusted without being moved.

Figure 2:
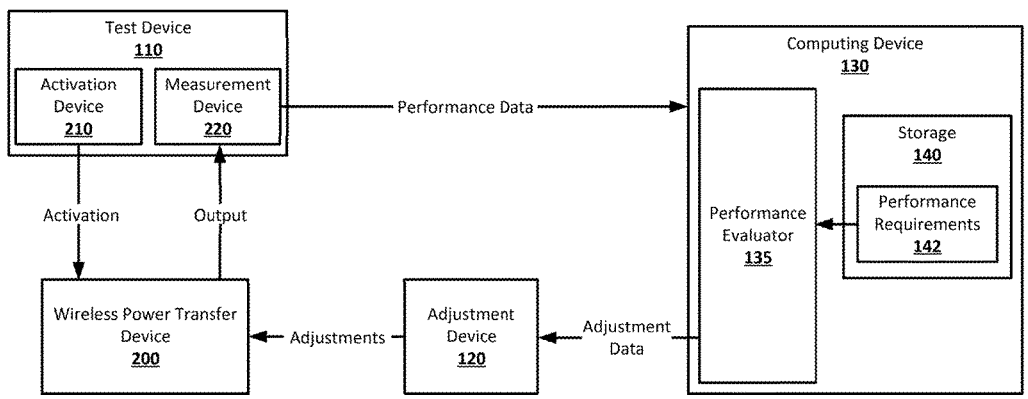
FIG. 2 shows an example arrangement suitable for performance adjustment for wireless power transfer devices according to an implementation of the disclosed subject matter.

FIG. 2 shows an example arrangement suitable for performance adjustment for wireless power transfer devices according to an implementation of the disclosed subject matter. A wireless power transfer device 200 may be tested using the test device 110. The wireless power transfer device 200 may be any suitable device that may be used to transfer power wirelessly, including, for example, an ultrasonic transmitter, an optical transmitter, or an RF transmitter. The wireless power transfer device 200 may be in any suitable stage of manufacture.

The test device 110 may test the wireless power transfer device 200 may providing activation to the wireless power transfer device 200. The test device 110 may include an activation device 210, which may be any suitable hardware and software for providing activation to the wireless power transfer device 200. The activation device 210 may include, for example, an electrical supply and related electronics for providing a controllable electrical signal to the wireless power transfer device 200, a vibrating plate or other vibrating device that may produce resonance in a vibrating element of the wireless power transfer device 200, a wireless power transmitter or receiver that may transmit wireless power or communications data or receive wireless power or communications data from the wireless power transfer device 200, or any other suitable device that may provide activation to the wireless power transfer device 200 in any suitable manner. The activation device 210 and may use any suitable combination of activations together or in sequence.

The activation may be, for example, the supply of an electrical signal to the wireless power transfer device 200, causing the wireless power transfer device 200 to begin transmitting wireless power, communications data, or perform imagining related transmissions. The activation may be, for example, vibrating a wireless power transfer device that uses vibrating elements, such as the transducer elements of an ultrasonic transmitter. The activation may also be, for example, transmitting wireless power or communications data to or receiving wireless power or communication data from the wireless power transfer device.

The test device 110 may measure characteristics of the wireless power transfer device 200 after activation. The test device 110 may include a measurement device 220, which may be any suitable combination of hardware and software for measuring the various characteristics of the performance of the wireless test device 200. The measurement device 220 may be, for example, a laser vibrometer or other vibrometer, a microphone or array of microphones, an impedance analyzer, a wireless power receiving device, hardware and software for measuring current, voltage, amperage, charge, and other characteristics of an electrical signal generated by a wireless power receiving device or by the wireless power transfer device 200, hardware and software for measuring characteristics of acoustic or RF output of the wireless power transfer device 200 such as, for example, phase, amplitude, and frequency, hardware and software for determining bandwidth and error rates in wireless communications between the wireless power transfer device 200 and another suitable wireless power transfer device, or any other suitable hardware and software that may be used to measure some characteristic of the wireless power transfer device 200 as it behaves when activated. The measurements may be of any type of output from the wireless power transfer device 200, including the characteristics of output wireless power or communications, or output electrical signals, or may be of the integrity of input to the wireless power transfer device 200, such as the error rate in received data or the fidelity of an image received based on imaging output from the wireless power transfer device 200. The measurement device 220 may include any number of devices which may measure any number of characteristics of the wireless power transfer device 200.

The test device 110 may generate performance data from the characteristics of the wireless power transfer device 200 as measured by the measurement device 220. The performance data may include raw measurement results, and may also include characteristics based on analysis or extrapolation of the raw measurement results. The performance data may also include the nature of the activation which led to certain measurement results, such as, for example, the characteristics of a supplied electrical signal, including phase, frequency, current, voltage, power, and any other suitable characteristic, a frequency of vibrations, characteristics of supplied wireless power or transmitted communications data, which were used to activate the wireless power transfer device 200. This may allow for correlation of the measured characteristics of the wireless power transfer device 200 with the inputs to the wireless power transfer device 200 that resulted in those measured characteristics.

The performance data from the test device 110 may be received by the performance evaluator 135 of the computing device 130. The performance evaluator 135 may also receive the performance requirements 142 from the storage 140, and compare the performance data to the performance requirements 142. If the performance data meets the performance requirements 142, the wireless power transfer device 200 may be passed for the use associated with the performance requirements 142, and moved to a next step in the manufacturing process. The next step may involve further manufacturing of the wireless power transfer device 200, or the incorporation of the wireless power transfer device 200 into a larger product based on the use for which the wireless power transfer device 200 was passed. For example, a wireless power transfer device 200 passed for use as a wireless power transmitter may be incorporated into a wireless power transmitter/receiver that may use many wireless power transfer devices, a computing device such as a smartphone, tablet, laptop, wearable device or accessory case for such as computing device, any other type of electric or electronic device that may draw or transmit wireless power including sensors, home automation devices, consumer electronics and appliances. A wireless power transfer device 200 passed for wireless power receiving but not transmitting may be incorporated only into devices that will receive wireless power and will not need to transmit wireless power. A wireless power transfer device 200 passed for use in ultrasonic imaging may be incorporated into any suitable ultrasonic imaging or detection system, such as sensors used in cars for obstacle warnings or automated parking and driving.

If the wireless power transfer device 200 is not passed by the performance evaluator 135, the performance evaluator 135 may determine adjustments that may be made to the wireless power transfer device 200 to improve performance. The adjustments determined by the performance evaluator 135 may involve the addition or removal of mass from the wireless power transfer device 200, or the movement, alteration, or reconfiguration of components of the wireless power transfer device 200. The adjustments may be determined based on the measured characteristics of the wireless power transfer device 200 which did not meet the performance requirements 142. The adjustments may be an attempt to improve the performance of the wireless power transfer device 200 in those characteristics which did not meet the performance requirements 142. The performance evaluator 135 may determine adjustments in any suitable manner. For example, an ultrasonic transmitter which cannot achieve a high enough frequency of transmission may have some set number of microns of length removed from each cantilever of each transducer element based on the difference between the measured frequency of the ultrasonic transmitter and the frequency in the performance requirements 142. Adjustments to the firmware of the wireless power transfer device 200 may also be used, for example, to adjust how an input electrical signal driving the wireless power transfer device 200 is applied to the individual elements, for example, ultrasonic transducers or RF elements, of the wireless power transfer device 200. The number of microns removed may also be determined using a linear or non-linear relationship to the desired change in frequency. The performance evaluator 135 may generate adjustment data, which may include indications of the adjustments to be made in a manner that may be understandable by the adjustment device 120.

The adjustment device 120 may receive the adjustment data determined by the performance evaluator 135 and may apply the indicated adjustments to the wireless power transfer device 200. The adjustment device 120 may, for example, use a laser, mill, saw, or other device to remove mass from components of the wireless power transfer device 200, for example, removing some number of microns of length from the end of some number of cantilevers of transducer elements of an ultrasonic transmitter. The adjustment device 120 may add mass to the wireless power transfer device 200, for example, using epoxies, plastics, ceramics, metals, or any other suitable material. The added mass may be used to alter the shape of components of the wireless power transfer device, for example, creating a rounded tip on a cantilever. The adjustment device 120 may manipulate components of the wireless power transfer device 200, for example, adjusting or reshaping an antenna of a RF transmitter. The adjustment device 120 may update the firmware of the wireless power transfer device 200, for example, using a connection to some electronic storage of the wireless power transfer device 200.

After completing the adjustments to the wireless power transfer device 200, the adjustment device 120 may indicate that the adjustments have been applied. The adjustment device 120 may send an indication of the completion of the adjustments to, for example, the test device 110. The test device 110 may again test the wireless power transfer device 200, generating performance data based on the performance of the wireless power transfer device 200 after adjustments have been applied. The performance data may again be compared to the performance requirements 142 by the performance evaluator 135, which may again determine whether to pass the wireless power transfer device 200 for the use associated with the performance requirements 142.

In some implementations, after the wireless power transfer device 200 has been adjusted once, the performance evaluator 135 may fail the wireless power transfer device 200 if it does not meet the performance requirements 142 after being tested the second time. The performance evaluator 135 may fail the wireless power transfer device 200 for all uses, or may fail the wireless or the use associated with the performance requirements 142. If the performance evaluator 135 does not fail the wireless power transfer device 200 for all uses, the performance evaluator 135 may compare the performance data to different performance requirements, for example, the performance requirements 144, associated with a different use, and may pass the wireless power transfer device 200 for that use, fail the wireless power transfer device 200, or determine adjustments for the wireless power transfer device 200 based on the performance requirements 144.

In some implementations, after the wireless power transfer device 200 has been adjusted once, the performance evaluator 135 may determine further adjustments for the wireless power transfer device 200 if it fails to meet the performance requirements 142. The wireless power transfer device 200 may be adjusted any number of times, until, for example, the performance evaluator 135 determines that there are no possible further adjustments that may allow the wireless power transfer device 200 to meet the performance requirements 142, or until the wireless power transfer device 200 has been adjusted some threshold number of times. When no further adjustments are possible based on the performance requirements 142, or the threshold number of adjustments has been reached, the performance evaluator 135 may fail the wireless power transfer device 200, or may use different performance requirements, such as the performance requirements 144. If the performance evaluator 135 uses different performance requirements, the wireless power transfer device 200 may again be subject to adjustments until no further adjustments are possible based on the different performance requirements or the threshold number of adjustments is again reached.

Figure 3:
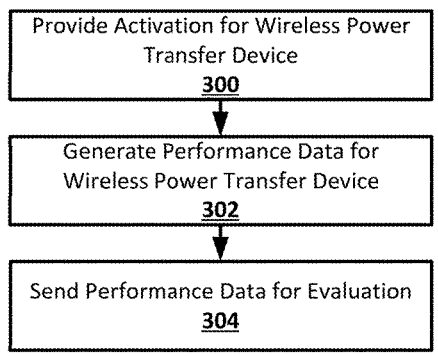
FIG. 3 shows an example procedure suitable for performance adjustment for wireless power transfer devices according to an implementation of the disclosed subject matter.

FIG. 3 shows an example procedure suitable for performance adjustment for wireless power transfer devices according to an implementation of the disclosed subject matter. At 300, activation may be provided to a wireless power transfer device. For example, the activation device 210 of the test device 110 may provide activation to the wireless power transfer device 200. The activation may be any suitable form, such as, for example, an electrical signal, vibrations, pressure, optical, RF energy, wireless power from a wireless power transmitter, or communications data from a wireless power transmitter.

At 302, performance data may be generated. For example, the measurement device 220 of the test device 110 may measure various characteristics of the activated wireless power transfer device 200. The performance data for the wireless power transfer device 200 may be generated from the measured characteristics and may include, for example, the raw measurements, analysis of the measurements, and characteristics of the activation that produced measured characteristics.

At 304, the performance data may be sent for evaluation. For example, the performance data may be sent to the performance evaluator 135, where the performance data may be evaluated and compared against performance requirements, such as the performance requirements 142 and 144.

Figure 4A:
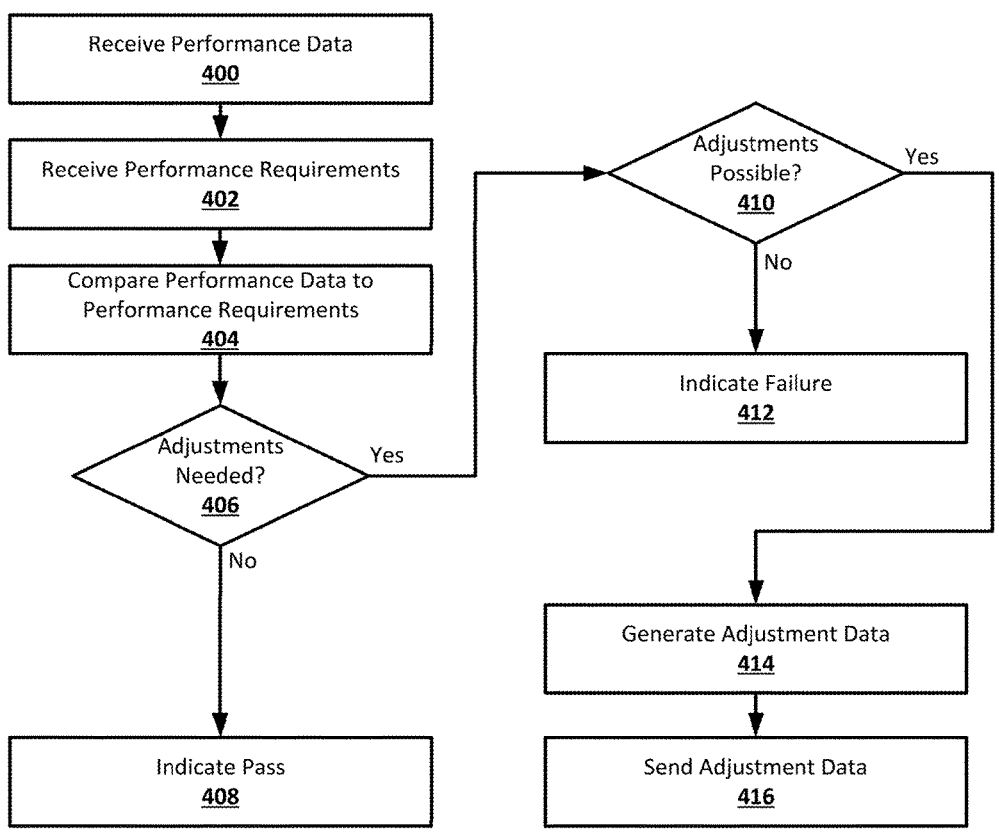
FIGS. 4A and 4B show example procedures suitable for performance adjustment for wireless power transfer devices according to an implementation of the disclosed subject matter.
Figure 4B:
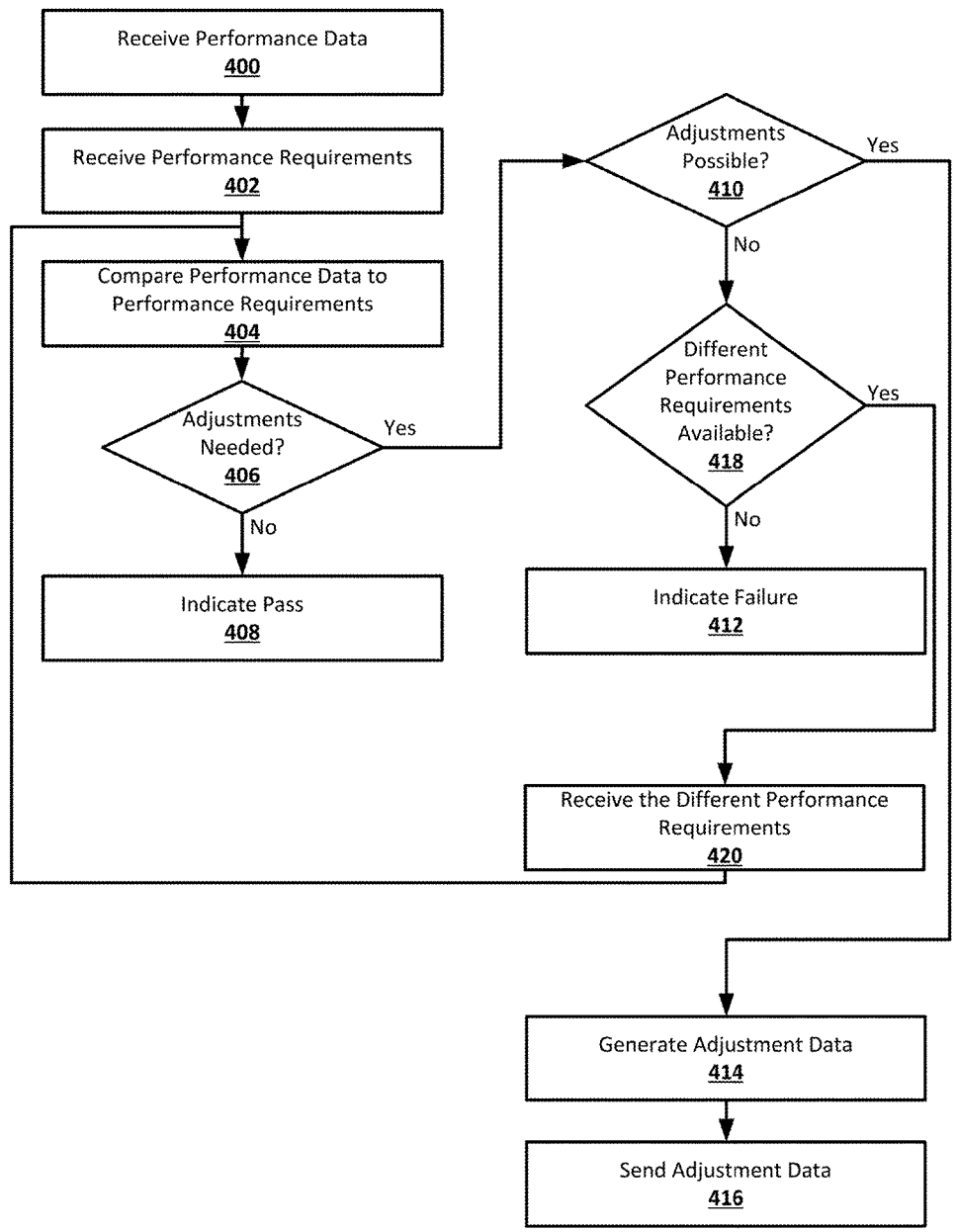

FIGS. 4A and 4B show example procedures suitable for performance adjustment for wireless power transfer devices according to an implementation of the disclosed subject matter. At 400, performance data may be received. For example, the performance evaluator 135 may receive performance data from the test device 110 for a recently tested wireless power transfer device 200.

At 402, performance requirements may be received. For example, the performance evaluator 135 may receive the performance requirements 142 from the storage 140 of the computing device 130. The performance requirements 142 may be associated with a use for which the wireless power transfer device 200 is being evaluated. For example, the performance requirements 142 may be associated with the use of a wireless power transfer device 200 as a wireless power transmitter.

At 404, the performance data may be compared with the performance requirements. For example, the performance data for the wireless power transfer device 200 may be compared with the performance requirements 142. The comparison may determine if the performance data meets the performance requirements 142.

At 406, whether adjustments are needed may be determined. For example, if the performance data need not meet the performance requirements 142, the performance evaluator 135 may determine that adjustments to the wireless power transfer device 200 are needed in order for the wireless power transfer device 200 to perform well enough to meet the performance requirements 142. If adjustments are needed, flow may proceed to 410. Otherwise, no adjustments may be needed. For example, the performance data for the wireless power transfer device 200 may meet the performance requirements 142, indicating that the wireless power transfer device 200 performs well enough to be used for the use associated with the performance requirements 142, which may be, for example, wireless power transmission. If the performance data meets the performance requirements, flow may proceed to 408. In some implementations, a pass may be indicated if performance improvements are needed, but can be made by the modification of a future manufacturing step, belying the need for adjustments made by the adjustment device 120.

At 408, a pass may be indicated. For example, the performance data for the wireless power transfer device 200 may have met the performance requirements 142. The performance evaluator 135 may indicate that the wireless power transfer device 200 is passed for the use associated with the performance requirements 142. The performance evaluator 135 may also indicate that the wireless power transfer device 200 is passed for other uses with performance requirements that are a subset of the performance requirements 142. The wireless power transfer device 200 may continue to the next manufacturing step, for example, having further components added, being incorporated into a product, or being prepared for shipment.

At 410, whether adjustments are possible may be determined. For example, the performance evaluator 135 may determine if it is possible to make any adjustments that may improve the performance of the wireless power transfer device 200 so that it meets the performance requirements 142. Adjustments may not possible when, for example, the wireless power transfer device 200 has already been adjusted some threshold number of times, when previous adjustments have rendered future adjustments difficult or impossible, or the performance of the wireless power transfer device 200 is so deficient that there may be no adjustments that can improve the performance enough to meet the performance requirements 142. If no adjustments are possible, flow may proceed to 412. Otherwise, adjustment may be possible, and flow may proceed to 414.

At 412, a failure may be indicated. For example, no adjustments to the wireless power transfer device 200 may be possible, and no additional performance requirements may be available. The wireless power transfer device 200 may have failed to meet the performance requirements 142 and 144 and any other performance requirements, and may have already been adjusted a threshold number of times, or there may be no possible adjustments that would improve the performance of the wireless power transfer device 200 so that would meet the performance requirements 142 or 144 or any other performance requirements. The performance evaluator 135 may indicate that the wireless power transfer device 200 is failed for the uses associated with the performance requirements 142 and 144 and any other performance requirements that were used. The wireless power transfer device 200 may be set aside for other possible uses, discarded, recycled, or otherwise disposed of.

At 414, adjustment data may be generated. For example, the performance evaluator 135 may determine adjustments that, when applied to the wireless power transfer device 200, may improve the performance of the wireless power transfer device 200 so that it may meet the performance requirements 142. The adjustments may be any suitable alteration to the wireless power transfer device 200, and may be determined in any suitable manner. The adjustments may be to the hardware or software, or firmware, of the wireless power transfer device 200. The adjustment data may be generated from the determined adjustments so that they may be implemented by the adjustment device 120.

At 416, the adjustment data may be sent. For example, the performance evaluator 135 may send, using any suitable wired or wireless communications, the adjustment date to the adjustment device 120. The performance evaluator 135 may control the adjustment device 120 directly, or the adjustment device 120 may receive and implement the adjustment data without any additional instruction or command from the performance evaluator 135.

In some implementations, the wireless power transfer device 200 may be compared to the performance requirements for more than use. At 410, if it is determined that no adjustments are possible, flow may proceed to 418.

At 418, whether there are different performance requirements available may be determined. For example, the wireless power transfer device 200 may have failed to meet the performance requirements 142. The performance evaluator 135 may determine whether performance requirements other than the performance requirements 142, such that performance requirements 144, are available. If different performance requirements are available, flow may proceed to 420. Otherwise, flow may proceed to 412.

At 420, the different performance requirements may be received. For example, the performance evaluator 135 may receive the performance requirements 144 from the storage 140 of the computing device 130. The performance requirements 144 may be associated with a use for which the wireless power transfer device 200 is being evaluated, which may different from the use associated with the performance requirements 142. For example, the performance requirements 144 may be associated with the use of a wireless power transfer device 200 as a wireless power receiver. Flow may proceed back to 404, where the performance data for the wireless power transfer device 200 may be compared to the performance requirements 144.

Figure 5:
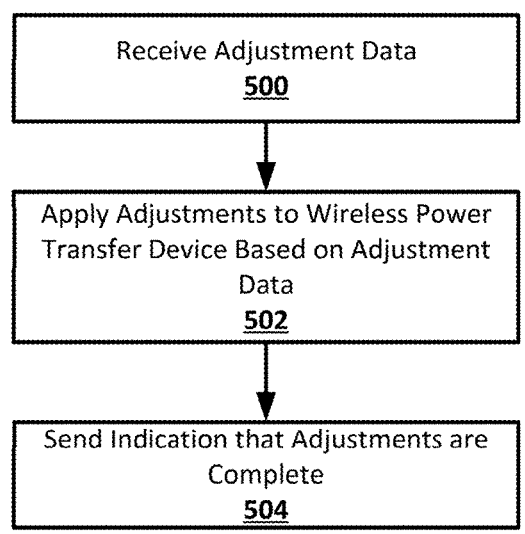
FIG. 5 shows an example procedure suitable for performance adjustment for wireless power transfer devices according to an implementation of the disclosed subject matter.

FIG. 5 shows an example procedure suitable for performance adjustment for wireless power transfer devices according to an implementation of the disclosed subject matter. At 500, adjustment data may be received. For example, the adjustment device 120 may receive the adjustment data from the performance evaluator 135. The adjustment data may have been generated based on the performance data of a tested wireless power transfer device 200, and may indicate adjustment to be applied to the wireless power transfer device 200.

At 502, adjustments may be applied to a wireless power transfer device based on the adjustment data. For example, the adjustment device 120 may apply any adjustments indicated by the adjustment data to the wireless power transfer device 200. The adjustment device 120 may, for example, add or remove mass, or otherwise manipulate components of the wireless power transfer device 200, for example, changing the shape or positioning of components, or may modify, update, or replace the firmware of the wireless power transfer device 200.

At 504, an indication that adjustments are complete may be sent. For example, the adjustment device 120, or computing device controlling the adjustment device 120, may send an indication that adjustments to the wireless power transfer device 200 are complete. The indication may be sent to, for example, the test device 110 or performance evaluator 135, and may initiate another round of testing of the wireless power transfer device 200.

Figure 6:
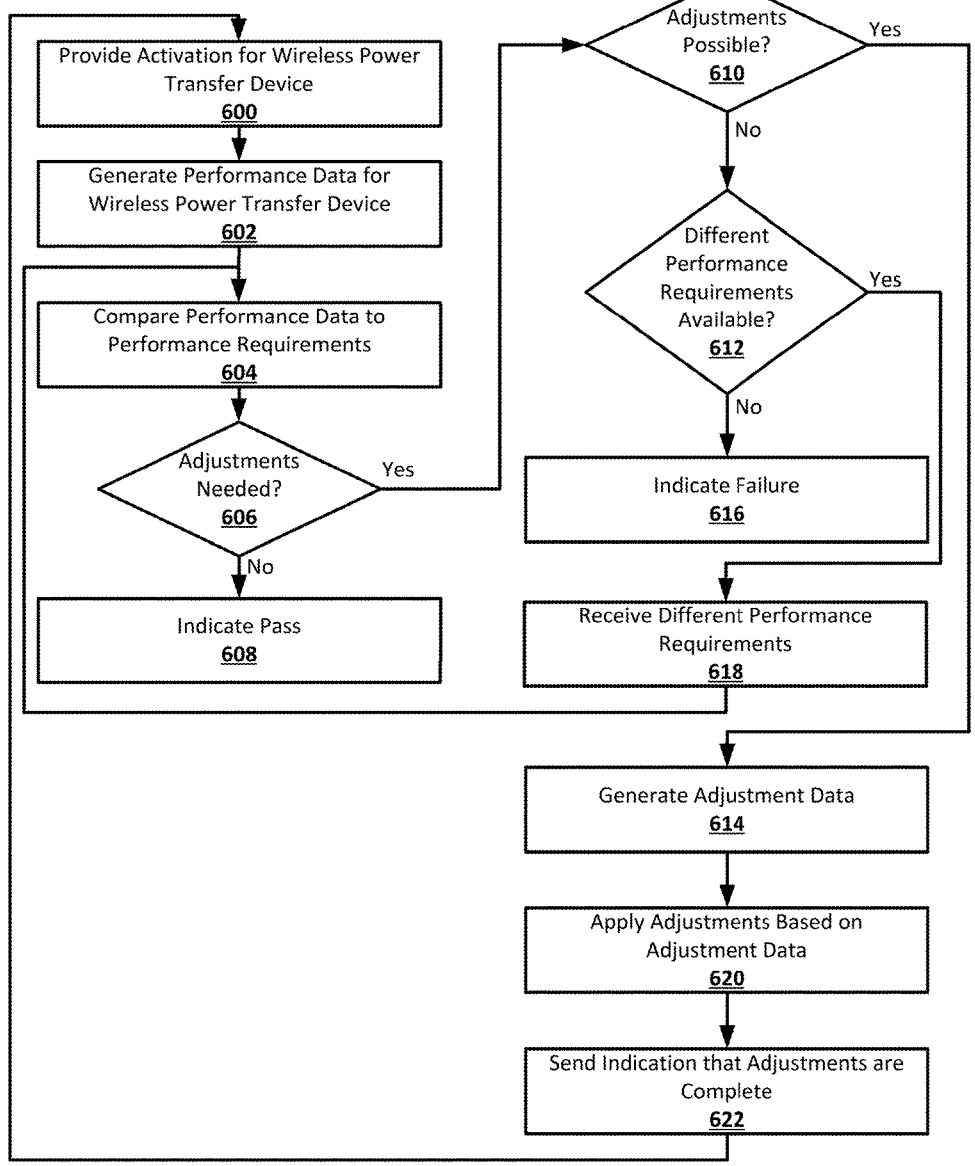
FIG. 6 shows an example procedure suitable for performance adjustment for wireless power transfer devices according to an implementation of the disclosed subject matter.

FIG. 6 shows an example procedure suitable for performance adjustment for wireless power transfer devices according to an implementation of the disclosed subject matter. At 600, activation may be provided to a wireless power transfer device. For example, the activation device 210 of the test device 110 may provide activation to the wireless power transfer device 200. The activation may be any suitable form, such as, for example, an electrical signal, vibrations, wireless power from a wireless power transmitter, or communications data from a wireless power transmitter.

At 602, performance data may be generated. For example, the measurement device 220 of the test device 110 may measure various characteristics of the activated wireless power transfer device 200. The performance data for the wireless power transfer device 200 may be generated from the measured characteristics and may include, for example, the raw measurements, analysis of the measurements, and characteristics of the activation that produced measured characteristics.

At 604, the performance data may be compared with the performance requirements. For example, the performance data for the wireless power transfer device 200 may be compared with the performance requirements 142. The comparison may determine if the performance data meets the performance requirements 142.

At 606, whether adjustments are needed may be determined. For example, if the performance data need not meet the performance requirements 142, the performance evaluator 135 may determine that adjustments to the wireless power transfer device 200 are needed in order for the wireless power transfer device 200 to perform well enough to meet the performance requirements 142. If adjustments are needed, flow may proceed to 410. Otherwise, no adjustments may be needed. For example, the performance data for the wireless power transfer device 200 may meet the performance requirements 142, indicating that the wireless power transfer device 200 performs well enough to be used for the use associated with the performance requirements 142, which may be, for example, wireless power transmission. If the performance data meets the performance requirements, flow may proceed to 408. In some implementations, a pass may be indicated if performance improvements are needed, but can be made by the modification of a future manufacturing step, belying the need for adjustments made by the adjustment device 120.

At 608, a pass may be indicated. For example, the performance data for the wireless power transfer device 200 may have met the performance requirements 142. The performance evaluator 135 may indicate that the wireless power transfer device 200 is passed for the use associated with the performance requirements 142. The performance evaluator 135 may also indicate that the wireless power transfer device 200 is passed for other uses with performance requirements that are a subset of the performance requirements 142. The wireless power transfer device 200 may continue to the next manufacturing step, for example, having further components added, being incorporated into a product, or being prepared for shipment.

At 610, whether adjustments are possible may be determined. For example, the performance evaluator 135 may determine if it is possible to make any adjustments that may improve the performance of the wireless power transfer device 200 so that it meets the performance requirements 142. Adjustments may not possible when, for example, the wireless power transfer device 200 has already been adjusted some threshold number of times, when previous adjustments have rendered future adjustments difficult or impossible, or the performance of the wireless power transfer device 200 is so deficient that there may be no adjustments that can improve the performance enough to meet the performance requirements 142. If no adjustments are possible, flow may proceed to 612. Otherwise, adjustment may be possible, and flow may proceed to 614.

At 612, whether there are different performance requirements available may be determined. For example, the wireless power transfer device 200 may have failed to meet the performance requirements 142. The performance evaluator 135 may determine whether performance requirements other than the performance requirements 142, such that performance requirements 144, are available. If different performance requirements are available, flow may proceed to 618. Otherwise, flow may proceed to 616.

At 616, a failure may be indicated. For example, no adjustments to the wireless power transfer device 200 may be possible, and no additional performance requirements may be available. The wireless power transfer device 200 may have failed to meet the performance requirements 142 and 144 and any other performance requirements, and may have already been adjusted a threshold number of times, or there may be no possible adjustments that would improve the performance of the wireless power transfer device 200 so that would meet the performance requirements 142 or 144 or any other performance requirements. The performance evaluator 135 may indicate that the wireless power transfer device 200 is failed for the uses associated with the performance requirements 142 and 144 and any other performance requirements that were used. The wireless power transfer device 200 may be set aside for other possible uses, discarded, recycled, or otherwise disposed of.

At 618, the different performance requirements may be received. For example, the performance evaluator 135 may receive the performance requirements 144 from the storage 140 of the computing device 130. The performance requirements 144 may be associated with a use for which the wireless power transfer device 200 is being evaluated, which may different from the use associated with the performance requirements 142. For example, the performance requirements 144 may be associated with the use of a wireless power transfer device 200 as a wireless power receiver. Flow may proceed back to 604, where the performance data for the wireless power transfer device 200 may be compared to the performance requirements 144.

At 614, adjustment data may be generated. For example, the performance evaluator 135 may determine adjustments that, when applied to the wireless power transfer device 200, may improve the performance of the wireless power transfer device 200 so that it may meet the performance requirements 142. The adjustments may be any suitable alteration to the wireless power transfer device 200, and may be determined in any suitable manner. The adjustments may be to the hardware or software, or firmware, of the wireless power transfer device 200. The adjustment data may be generated from the determined adjustments so that they may be implemented by the adjustment device 120.

At 620, adjustments may be applied to a wireless power transfer device based on the adjustment data. For example, the adjustment device 120 may apply any adjustments indicated by the adjustment data to the wireless power transfer device 200. The adjustment device 120 may, for example, add or remove mass, or otherwise manipulate components of the wireless power transfer device 200, for example, changing the shape or positioning of components, or may modify, update, or replace the firmware of the wireless power transfer device 200.

At 622, an indication that adjustments are complete may be sent. For example, the adjustment device 120, or computing device controlling the adjustment device 120, may send an indication that adjustments to the wireless power transfer device 200 are complete. The indication may be sent to, for example, the test device 110 or performance evaluator 135, and may initiate another round of testing of the wireless power transfer device 200. Flow may proceed back to 600.

Figure 7:
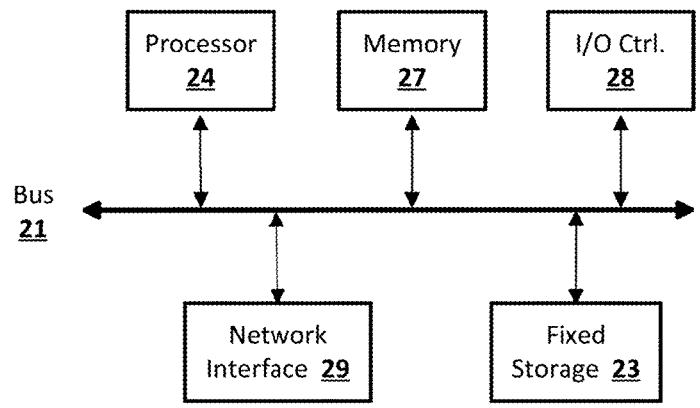
FIG. 7 shows a computer according to an embodiment of the disclosed subject matter.

Embodiments of the presently disclosed subject matter may be implemented in and used with a variety of component and network architectures. FIG. 7 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 8.

Many other devices or components (not shown) may be connected in a similar manner, such as document scanners, digital cameras, auxiliary, supplemental, or backup systems, or the like. Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 8:
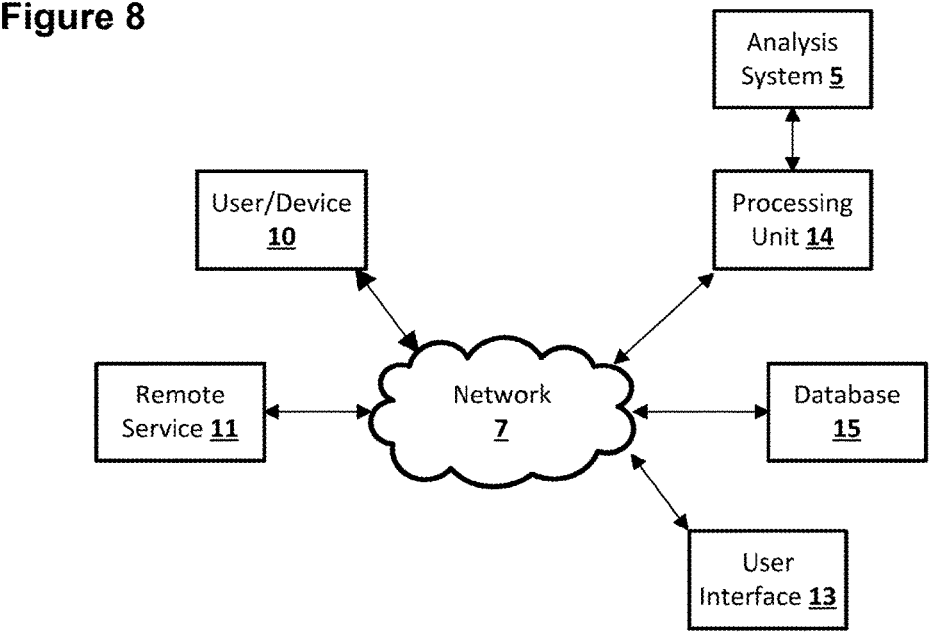
FIG. 8 shows a network configuration according to an embodiment of the disclosed subject matter.

FIG. 8 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
    activating a wireless power transfer device;
    measuring at least one characteristic of the performance of the activated wireless power transfer device;
    determining that the at least one measured characteristic of the activated wireless power transfer device does not meet at least one performance requirement for the wireless power transfer device;
    determining at least one adjustment to be applied to the wireless power transfer device, wherein the at least one adjustment is based on the determining that the at least one measured characteristic of the activated wireless power transfer device does not meet at least one performance requirement for the wireless power transfer device, and wherein the at least one adjustment is the removal of mass from the wireless power transfer device, the addition of mass to the wireless power transfer device, the repositioning of one or more components of the wireless power transfer device, or the alteration of stiffness of the wireless power transfer device;
    applying the at least one adjustment to the wireless power transfer device;
    activating the wireless power transfer device after application of the at least one adjustment;
    measuring the at least one characteristic of the performance of the activated wireless power transfer device;
    determining that the at least one measured characteristic of the activated wireless power transfer device does not meet the performance requirements associated with a use for the wireless power transfer device, wherein the at least one performance requirement is associated with a use for the wireless power device;
    determining that the wireless power transfer device will meet the performance requirements associated with the use after a future manufacturing step; and
    indicating that the wireless power transfer device is passed for the use associated with the performance requirements.

2. The method of claim 1, wherein the at least one performance requirement is associated with a use for the wireless power device and further comprising:
    determining that the at least one measured characteristic of the activated wireless power transfer device does not meet the performance requirements associated with the use for the wireless power transfer device; and
    indicating that the wireless power transfer device is failed for the use associated with the performance requirements.

3. The method of claim 1, wherein the at least one performance requirement is associated with a use for the wireless power device and further comprising:
    determining that the at least one measured characteristic of the activated wireless power transfer device does not meet the performance requirements associated with the use for the wireless power transfer device; and
    determining at least one additional adjustment to be applied to the wireless power transfer device, wherein the at least one adjustment is based on the difference between the at least one measured characteristic and the performance requirements not met by the at least one measured characteristic.

4. The method of claim 3, further comprising, before determining the at least one additional adjustment, determining that a threshold number of adjustments have not already been made to the wireless power transfer device.

5. The method of claim 1, wherein the at least one performance requirement is associated with a use for the wireless power device and further comprising:
    determining that the at least one measured characteristic of the activated wireless power transfer device meets the performance requirements associated with the use for the wireless power transfer device; and
    indicating that the wireless power transfer device is passed for the use associated with performance requirements.

6. The method of claim 1, wherein the at least one performance requirement is associated with a first use for the wireless power device and further comprising:
    determining that the at least one measured characteristic of the activated wireless power transfer device does not meet the performance requirements associated with the first use for the wireless power transfer device;
    determining that the at least one measured characteristic of the activated wireless power transfer device meets a different performance requirement associated with a second use for the wireless power transfer device; and
    indicating that the wireless power transfer device is passed for the second use associated with the different performance requirements.

7. The method of claim 1, wherein activating a wireless power transfer device comprises one or more of: vibrating the wireless power transfer device, supplying an electrical signal to the wireless power transfer device, inducing resonance in the wireless power transfer device, transmitting wireless power to the wireless power transfer device, and transmitting communications data to the wireless power transfer device.

8. The method of claim 1, wherein the wireless power transfer device is an ultrasonic device capable of at least one of transmitting and receiving, an RF device capable of at least one of transmitting and receiving, or an optical device capable of at least one of transmitting and receiving.

9. The method of claim 1, wherein at least one characteristic of the performance of the activated wireless power transfer device is amplitude, frequency, or phase of output from the wireless power transfer device, peak frequency response, bandwidth, efficiency, directivity, electrical amplitude or impedance of the wireless power transfer device, power or power density transferred by the wireless power transfer device, power generated by the wireless power transfer device, or signal-to-noise, sensitivity, data transmission rate or error rate of the wireless power transfer device.

10. The method of claim 1, wherein the performance requirements comprise one or more of: a center frequency at which the wireless power transfer device should be able to emit at or receive at, minimum or maximum amplitude, bandwidth, efficiency, directivity, power level, or power densities that the wireless power transfer device should generate, a minimum number of transducer elements that must be able to vibrate in phase or within a phase range at a given frequency or a minimum number of transducer elements with a phase that can be controlled within a specified margin of error, a minimum level of power generated by the wireless power transfer device when receiving a specified level of transmitted power, a minimum efficiency for transmitting or receiving wireless power at a specified frequency, and a minimum effective range of wireless power transmission.

11. The method of claim 1, wherein the at least one adjustment further is the modifying, updating, or replacement of firmware of the wireless power transfer device, or the modification of one or more components of the wireless power transfer device.

12. The method of claim 1, wherein the use associated with the performance requirements is wireless power transmission, wireless power receiving, communications, imaging, range finding, or obstacle detection.

13. The method of claim 1, wherein the at least one adjustment comprises adjusting one or more of the length, width shape, thickness, and electrode of a free moving portion of a cantilever in an ultrasonic transducer.

14. A system for performance adjustment for wireless power transfer devices comprising:
a test device adapted and configured to activate a wireless power transfer device, measure at least one characteristic of a wireless power transfer device that has been activated, and generate performance data from the measured at least one characteristic;
a computing device adapted and configured to compare the performance data to performance requirements associated with a user for the wireless power transfer device, determine whether the performance data meets the performance requirements, and generate adjustment data indicating adjustments to be made to the wireless power transfer device wherein the adjustments comprise one or more of: the removal of mass from the wireless power transfer device, the addition of mass to the wireless power transfer device, the repositioning of one or more components of the wireless power transfer device, and the alteration of stiffness of the wireless power transfer device, activate the wireless power transfer device after application of at least one of the adjustments, determine that at least one measured characteristic of the activated wireless power transfer device does not meet the performance requirements associated with a use for the wireless power transfer device, wherein the at least one performance requirement is associated with a use for the wireless power device, determine that the wireless power transfer device will meet the performance requirements associated with the use after a future manufacturing step, and indicate that the wireless power transfer device is passed for the use associated with the performance requirements;
an adjustment device adapted and configured to apply the adjustments indicated by the adjustment data to the wireless power transfer device;
an activation device adapted and configured to provide activation to the wireless power transfer device to activate the wireless power transfer device; and
a measurement device adapted and configured to measure the at least one characteristic of the wireless power transfer device.

15. The system of claim 14, wherein the activation device comprises an electrical signal supply, a vibrating plate, a resonator, or a wireless power transmitter.

16. The system of claim 14, wherein the measurement device comprises a vibrometer, an ammeter, a voltmeter, a charge meter, a microphone, an RF receiver, a VSWR meter, an optical power meter, or a wireless power receiver.

17. The system of claim 14, wherein the wireless power transfer device comprises an ultrasonic device capable of at least one of transmitting and receiving, an RF device capable of at least one of transmitting and receiving, or an optical device capable of at least one of transmitting and receiving.

18. The system of claim 14, wherein the computing device is further adapted and configured to indicate that the wireless power transfer device is passed for the use associated with the performance requirements when the performance data meets the performance requirements.

19. The system of claim 14, wherein the computing device is further adapted and configured to indicate that the wireless power transfer device is failed for the use associated with the performance requirements when the performance data does not meet the performance requirements and no adjustments to the wireless power transfer device are possible.

20. The system of claim 19, wherein the computing device is further adapted and configured to determine that no adjustments are possible based on one or more of: a number of adjustments already applied to the wireless power transfer device, a number of available performance requirements associated with uses for the wireless power transfer device, and deficit between the performance data for the wireless power transfer device and the performance requirements for at least one use.

21. A computer-implemented method comprising:
receiving performance data for a wireless power transfer device;
determining that the performance data for the wireless power transfer device does not meet performance requirements for a use for the wireless power transfer device; and
generating adjustment data indicating adjustments to be applied to the wireless power transfer device, wherein the adjustments comprise one or more of: the removal of mass from the wireless power transfer device, the addition of mass to the wireless power transfer device, the repositioning of one or more components of the wireless power transfer device, and the alteration of stiffness of the wireless power transfer device;
receiving additional performance data for the wireless power transfer device after the application of the adjustments in the adjustment data;
determining based on the additional performance data that the wireless power transfer device does not meet the performance requirements associated with the use for the wireless power transfer device;

determining based on the additional performance data that the wireless power transfer device will meet the performance requirements associated with the use after a future manufacturing step; and
indicating that the wireless power transfer device is passed for the use associated with the performance requirements.

22. The method of claim 21, wherein the adjustment data indicates at least one adjustment based on a difference between a characteristic in the performance data and a metric in the performance requirements.

23. The method of claim 21, further comprising:
receiving new performance data for the wireless power transfer device;
determining that the new performance data for the wireless power transfer device meets the performance requirements for the use for the wireless power transfer device; and
indicating the wireless power transfer device is passed for the use.

24. The method of claim 21, further comprising:
receiving new performance data for the wireless power transfer device; and
determining that the new performance data for the wireless power transfer device does not meet the performance requirements for the use for the wireless power transfer device.

25. The method of claim 24, further comprising:
indicating that the wireless power transfer device is failed for the use.

26. The method of claim 24, further comprising:
determining that the new performance data for the wireless power transfer device meets the performance requirements for a second use for the wireless power transfer device; and
indicating that the wireless power transfer device is passed for the second use.

27. The method of claim 21, wherein the wireless power transfer device is an ultrasonic device capable of at least one of transmitting and receiving, an RF device capable of at least one of transmitting and receiving, or an optical device capable of at least one of transmitting and receiving.

28. The method of claim 21, wherein performance data for the wireless power transfer device comprises one or more of amplitude, frequency, or phase of output from the wireless power transfer device, peak frequency response, bandwidth, efficiency, directivity, electrical amplitude or impedance of the wireless power transfer device, power or power density transferred by the wireless power transfer device, power generated by the wireless power transfer device, and signal-to-noise, sensitivity, data transmission rate or error rate of the wireless power transfer device.

29. The method of claim 21, wherein the performance requirements comprise one or more of: a center frequency at which the wireless power transfer device should be able to emit at or receive at, minimum or maximum amplitude, bandwidth, efficiency, directivity, power level, or power densities that the wireless power transfer device should generate, a minimum number of transducer elements that must be able to vibrate in phase or within a phase range at a given frequency or a minimum number of transducer elements with a phase that can be controlled within a specified margin of error, a minimum level of power generated by the wireless power transfer device when receiving a specified level of transmitted power, a minimum efficiency for transmitting or receiving wireless power at a specified frequency, and a minimum effective range of wireless power transmission.

30. The method of claim 21, wherein adjustments further comprise one or more: the modification of firmware of the wireless power transfer device, modifying, updating, or replacing firmware of the wireless power transfer device, or the modification of one or more components of the wireless power transfer device.

31. The method of claim 21, wherein the use associated with the performance requirements is wireless power transmission, wireless power receiving, communications, imaging, range finding, or obstacle detection.

32. A method comprising:
receiving performance data for a wireless power transfer data, wherein the performance data comprises data relating to the performance of one or more individual elements of the wireless power transfer device;
storing the received performance data; and
adjusting one or more parameters of operation of the wireless power transfer device based on the performance, wherein the adjusting comprises one or more of: the removal of mass from the wireless power transfer device, the addition of mass to the wireless power transfer device, the repositioning of one or more components of the wireless power transfer device, and the alteration of stiffness of the wireless power transfer device;
receiving additional performance data for the wireless power transfer device after the adjusting of the one or more parameters of operation of the wireless power transfer device;
determining based on the additional performance data that the wireless power transfer device does not meet the performance requirements associated with the use for the wireless power transfer device;
determining based on the additional performance data that the wireless power transfer device will meet the performance requirements associated with the use after a future manufacturing step; and
indicating that the wireless power transfer device is passed for the use associated with the performance requirements.

33. The method of claim 32, wherein the received performance data is stored on the wireless power transfer device.

34. The method of claim 32, wherein the received performance data is stored separately from and associated with the wireless power transfer device.

35. The method of claim 32, wherein adjusting the one or more parameters of operation of the wireless power transfer device based on the performance data equalizes performance across individual elements of the wireless power transfer device.

* * * * *